US010892642B2

(12) United States Patent
Matsukuma et al.

(10) Patent No.: US 10,892,642 B2
(45) Date of Patent: Jan. 12, 2021

(54) COMPRESSED AIR ENERGY STORAGE POWER GENERATION APPARATUS AND COMPRESSED AIR ENERGY STORAGE POWER GENERATION METHOD (71) Applicant: Kobe Steel, Ltd., Hyogo (JP)

(72) Inventors: Masaki Matsukuma, Takasago (JP); Hiroki Saruta, Takasago (JP); Takashi Sato, Takasago (JP); Kanami Sakamoto, Takasago (JP); Masatake Toshima, Kobe (JP); Yohei Kubo, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/763,771

(22) PCT Filed: Sep. 21, 2016

(86) PCT No.: PCT/JP2016/077880
§ 371 (c)(1),
(2) Date: Mar. 27, 2018

(87) PCT Pub. No.: WO2017/057144
PCT Pub. Date: Apr. 6, 2017

(65) Prior Publication Data
US 2018/0283275 A1 Oct. 4, 2018

(30) Foreign Application Priority Data
Sep. 29, 2015 (JP) ................................. 2015-191668

(51) Int. Cl.
*H02K 7/00* (2006.01)
*H02J 15/00* (2006.01)
(Continued)

(52) U.S. Cl.
CPC ................ *H02J 15/00* (2013.01); *F02C 6/16* (2013.01); *F24F 5/0085* (2013.01); *H02K 7/1823* (2013.01)

(58) Field of Classification Search
CPC ...... F02C 1/05; F02C 6/00; F02C 6/16; F24F 5/0085; H02K 7/1823; Y02P 90/50
(Continued)

(56) References Cited

U.S. PATENT DOCUMENTS 5,317,904 A * 6/1994 Bronicki .................. F02C 6/16
60/659
5,537,822 A * 7/1996 Shnaid ...................... F02C 6/04
60/650
(Continued)

FOREIGN PATENT DOCUMENTS

JP S53-134138 A 11/1978
JP H03-054326 A 3/1991
(Continued)

OTHER PUBLICATIONS

International Preliminary Report on Patentability and Written Opinion of the International Searching Authority issued in PCT/JP2016/077880; dated Apr. 12, 2018.
(Continued)

*Primary Examiner* — Julio C. Gonzalez
(74) *Attorney, Agent, or Firm* — Studebaker & Brackett PC (57) ABSTRACT A compressed air storage power generation apparatus is provided with a motor, a compressor, a pressure accumulation tank, an expander, a generator, a first heat exchanger and a cold heat extracting unit. The motor is driven by input power generated using renewable energy. The compressor is mechanically connected to the motor and compresses air. The pressure accumulation tank accumulates the com-
(Continued)

pressed air compressed by the compressor. The expander is driven by the compressed air supplied from the pressure accumulation tank. The generator is mechanically connected to the expander. The first heat exchanger exchanges heat between the compressed air supplied from the compressor and a heat medium and cools the compressed air to room temperature. The cold heat extracting unit extracts air serving as working fluid as cold air of the room temperature or lower. Due to this configuration, the compressed air energy storage power generation apparatus capable of smoothing input power that varies irregularly and efficiently performing heating and cooling with the input power is provided.

13 Claims, 5 Drawing Sheets

(51) Int. Cl.
  *F02C 6/16* (2006.01)
  *F24F 5/00* (2006.01)
  *H02K 7/18* (2006.01)
(58) Field of Classification Search
  USPC .................. 290/52; 62/6, 606, 470; 60/772
  See application file for complete search history.

(56) References Cited

U.S. PATENT DOCUMENTS

| | | | |
|---|---|---|---|
| 2010/0037653 A1* | 2/2010 | Enis | B01D 5/0027 62/532 |
| 2010/0251711 A1* | 10/2010 | Howes | F01K 3/06 60/659 |
| 2011/0000227 A1* | 1/2011 | Kamiya | F04C 23/006 62/6 |
| 2011/0100010 A1* | 5/2011 | Freund | F02C 1/005 60/659 |
| 2011/0127004 A1 | 6/2011 | Freund et al. | |
| 2012/0036853 A1 | 2/2012 | Kidd et al. | |
| 2012/0102937 A1* | 5/2012 | Anikhindi | F02C 1/04 60/413 |
| 2014/0102103 A1* | 4/2014 | Yamamoto | F01K 15/00 60/658 |
| 2018/0266315 A1* | 9/2018 | Kubo | F28F 27/02 |
| 2018/0347459 A1* | 12/2018 | Matsukuma | F02C 6/14 |

FOREIGN PATENT DOCUMENTS

| | | |
|---|---|---|
| JP | H03-054327 A | 3/1991 |
| JP | H03-065032 A | 3/1991 |
| JP | H07-042573 A | 2/1995 |
| JP | H07-077062 A | 3/1995 |
| JP | 2003-065621 A | 3/2003 |
| JP | 2012-097737 A | 5/2012 |
| JP | 2012-239370 A | 12/2012 |
| JP | 2013-512410 A | 4/2013 |
| JP | 2013-536357 A | 9/2013 |
| JP | 2015-095976 A | 5/2015 |
| WO | WO-2011076926 A2 * | 6/2011 ............... F02C 6/16 |

OTHER PUBLICATIONS

International Search Report issued in PCT/JP2016/077880; dated Dec. 13, 2016.
The extended European search report issued by the European Patent Office dated May 7, 2019, which corresponds to European Patent Application No. 16851318.2-1007 and is related to U.S. Appl. No. 15/763,771.

* cited by examiner

COMPRESSED AIR ENERGY STORAGE POWER GENERATION APPARATUS AND COMPRESSED AIR ENERGY STORAGE POWER GENERATION METHOD

CROSS-REFERENCE TO RELATED APPLICATIONS

This is a national phase application in the United States of International Patent Application No. PCT/JP2016/077880 with an international filing date of Sep. 21, 2016, which claims priority of Japanese Patent Application No. 2015-191668 filed on Sep. 29, 2015 the contents of which are incorporated herein by reference.

TECHNICAL FIELD

The present invention relates to a compressed air energy storage power generation apparatus and a compressed air energy storage power generation method.

BACKGROUND ART

As a typical technique for smoothing output of power generation using irregularly fluctuating unstable energy such as renewable energy, there is a storage battery that stores electricity when surplus generated electric power is generated, and supplements electricity when electric power is insufficient. As an example of a large capacity storage battery, a sodium-sulfur battery, a redox flow battery, a lithium storage battery, a lead storage battery, and the like are known. Any one of these batteries is a chemical secondary battery, and can output stored energy only in the form of electricity.

In addition, as another smoothing equipment, there is known a technique called compressed air energy storage (CAES) in which compressed air discharged from a compressor is stored in place of electricity when surplus electric power is generated, and the compressed air is reconverted to electricity by an air turbine generator or the like when necessary (refer to JP 2012-97737 A, JP 2013-512410 A, and JP 2013-536357 A).

SUMMARY OT THE INVENTION

Technical Problem to be Solved by the Invention

As an output destination of electric power generated from renewable energy, while there is a case where the electric power is output as electric power to a commercial system to sell electricity, it is also conceivable that the electric power may be consumed in a power station or a neighboring customer without returning it to a commercial system. As an example of such a customer, there are a data center where huge cooling is required for cooling computers, and a precision machine plant and a semiconductor factory each of which is required to be adjusted to a constant temperature due to limitation in a manufacturing process.

Customers using large electric power each need a power saving technique that stores electricity when electric power consumption is small, and discharges electricity when electric power consumption increases to suppress maximum electric power consumption, according to fluctuations in power consumption.

It is an object of the present invention to provide a compressed air energy storage power generation apparatus capable of not only smoothing irregularly fluctuating electric power output, such as renewable energy, but also efficiently using even such fluctuating input electric power for cooling and heating.

Solution to Problem

A first aspect of the present invention, provides a compressed air energy storage power generation apparatus comprising:

an electric motor driven by irregularly fluctuating input electric power;

a compressor mechanically connected to the electric motor for compressing air;

a pressure accumulator for storing the compressed air compressed by the compressor;

an expander driven by the compressed air supplied from the pressure accumulator;

a generator mechanically connected to the expander;

a first heat exchanger that exchanges heat between the compressed air supplied from the compressor and a heat medium to cool the compressed air to a near room temperature; and a cold heat extracting unit that extracts air serving as working fluid as cold air at a room temperature or lower.

The cold heat extracting unit may include an exhaust port of the expander.

According to this configuration, because the accumulator stores energy as compressed air, it is possible to smoothen irregularly fluctuating electric power output such as renewable energy. In addition, because the cold heat extracting unit extracts cold air at room temperature or lower (creates cold heat), even irregularly fluctuating electric power, such as renewable energy, can be efficiently used for cooling and heating. In particular, thermal efficiency can be greatly improved as compared with the case of directly using commercial electric power to produce cold heat. In addition, air can be efficiently cooled by using heat absorption due to expansion with power generation, it is possible to effectively use an expander as the cold heat extracting unit. While compressed air is cooled to the near room temperature in the first heat exchanger, the "near room temperature" means a temperature at which energy held by compressed air is not largely lost when the compressed air releases its heat to the outside air while being stored in the accumulator.

The cold heat extracting unit may include a second heat exchanger that exchanges heat between cool air at the room temperature or lower, supplied from the expander, and a refrigerant (e.g. water) to cool the refrigerant to the room temperature or lower, to obtain a cooling refrigerant (e.g. water).

By providing the second heat exchanger, it is possible to extract a cooling refrigerant to use it for cooling. In addition, temperature of the cooling refrigerant can be adjusted to a constant temperature by adjusting the amount of heat exchange between cool air and the refrigerant.

The first heat exchanger may serve as a hot heat extracting unit that extracts compression heat recovered by heat exchange as hot heat.

Because the first heat exchanger serves as the hot heat extracting unit, it is possible to take out hot heat in addition to cold heat to enable thermal efficiency to be further improved. In addition, there is no need to add new equipment for extracting the hot heat.

The hot heat extracting unit may be fluidly connected to a refrigerator.

Because the refrigerator can extract hot heat by converting it into cold heat, the compressed air energy storage power generation, as a whole, can extract more cold heat. As a result, cold heat from the refrigerator can be used in addition to cold heat from the cold heat extracting unit, so that it is possible to supply a large amount of cold heat to a customer who needs a large amount of cold heat, such as a data center and a large computer.

The compressed air energy storage power generation apparatus may further include a mode switching mechanism that switches between a cold heat extracting mode in which efficiency of extracting cold heat with the cold heat extraction unit is improved and a power generation mode in which efficiency of generating power with the generator is improved.

By providing the mode switching mechanism, it is possible to switch modes as needed, whereby not only thermal efficiency but also charge-discharge efficiency can be improved.

The compressed air energy storage power generation apparatus may further include:

a high pressure accumulator that has an allowable accumulated pressure value higher than an allowable accumulated pressure value of the pressure accumulator; and a high pressure compressor that compresses air to a higher pressure than the compressed air compressed by the compressor to supply the compressed air to the high pressure accumulator.

By providing the high-pressure accumulator and the high pressure compressor, it is possible to supply emergency power and cooling for a long time in an emergency such as a power failure of a commercial electric power system. This is particularly effective for a customer, such as a data center and a large computer, who needs emergency power and a large amount of cold heat even in a power failure.

A second aspect of the present invention provides a compressed air energy storage power generation method comprising:

compressing air with irregularly fluctuating input electric power;

cooling the compressed air increased in a temperature in the compressing step to a near room temperature;

storing the compressed air cooled to near the near room temperature; and expanding the stored compressed air to be used for power generation and cooling down the compressed air to the room temperature or lower at the same time to be extracted as cold air.

According to the present invention, because the accumulator stores energy as compressed air, irregularly fluctuating input electric power, such as electric power output by renewable energy, can be smoothened. In addition, because the cold heat extracting unit extracts cold air at room temperature or lower, even irregularly fluctuating input electric power can be efficiently used for cooling and heating.

DESCRIPTION OF EMBODIMENTS

Embodiments of the present invention will be described below with reference to the accompanying drawings.

First Embodiment

Figure 1:
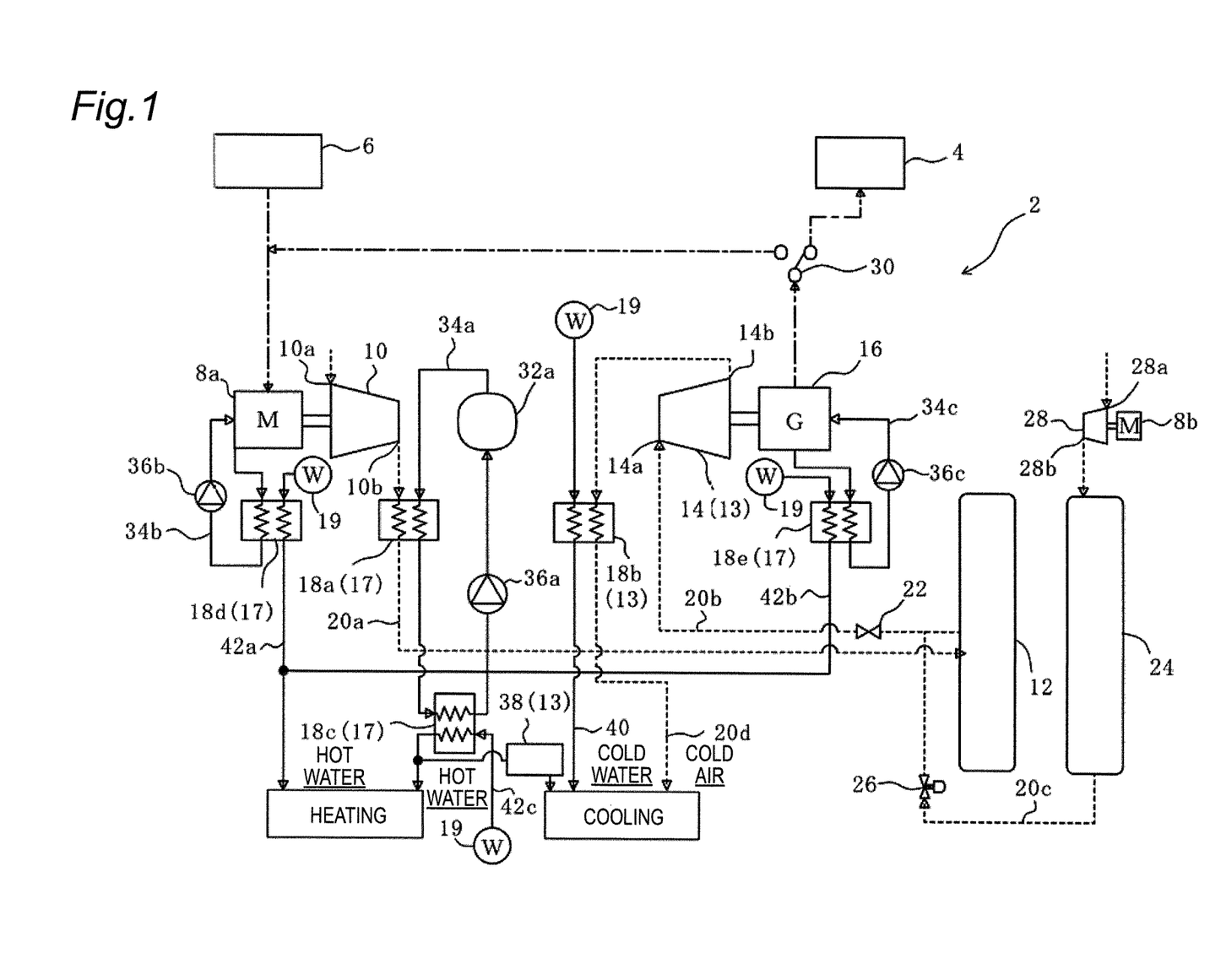
FIG. 1 is a schematic configuration view of a compressed air energy storage power generation apparatus according to a first embodiment of the present invention.

FIG. 1 is a schematic configuration diagram of a compressed air energy storage (CAES) power generation apparatus 2 according to a first embodiment of the present invention. The CAES power generation apparatus 2 not only smoothens output fluctuation to an electric power system 4 when electric power is generated using renewable energy, but also outputs electric power in accordance with fluctuations in electric power demand in the electric power system 4.

With reference to FIG. 1, the configuration of the CAES power generation apparatus 2 of the present embodiment will be described.

The CAES power generation apparatus 2 smoothens output fluctuations of a power generation apparatus 6 that uses renewable energy. The CAES power generation apparatus 2 includes at least a motor (electric motor) 8a, a compressor 10, a pressure accumulation tank (accumulator) 12, an expander 14, a generator 16, and a first heat exchanger 18a.

In the embodiment according to FIG. 1, while the power generation apparatus 6 uses renewable energy such as wind power generation and photovoltaic power generation, energy other than renewable energy is available as long as generated electric power irregularly fluctuates. For example, electric power fluctuating with an apparatus using large electric power installed in a factory or the like (e.g., a large computer, an electric furnace, or the like) may be used.

Irregularly fluctuating electric power generated by the power generation apparatus 6 using renewable energy is supplied to the motor 8a. Hereinafter, electric power supplied from the power generation apparatus 6 to the motor 8a is referred to as input electric power. The motor 8a is driven by the input electric power. The motor 8a is mechanically connected to the compressor 10.

The compressor 10 is driven by the motor 8a. The compressor 10 has a discharge port 10b that is fluidly connected to the pressure accumulation tank 12 through an air pipe 20a. When driven by the motor 8a, the compressor 10 sucks air from an intake port 10a, and compresses the air to discharge it from the discharge port 10b, and then pumps compressed air under pressure to the pressure accumulation tank 12 through the air pipe 20a. The air pipe 20a is provided with a first heat exchanger 18a.

The pressure accumulation tank 12 is fluidly connected to the expander 14 through an air pipe 20b. The pressure accumulation tank 12 stores compressed air pumped under pressure. That is, energy can be accumulated in the pressure accumulation tank 12 in the form of compressed air. The compressed air stored in the pressure accumulation tank 12 is supplied to the expander 14 through the air pipe 20b. The air pipe 20b is provided with a valve 22, so that supply of compressed air to the expander 14 can be allowed or interrupted by opening and closing the valve 22.

The expander 14 is mechanically connected to the generator 16. The expander 14, to which compressed air is supplied through an air supply port 14a, is operated by the compressed air supplied to drive the generator 16. That is, the compressed air stored in the pressure accumulation tank 12 is expanded to be used for power generation. The expanded air is cooled down to room temperature or lower by heat absorption during expansion, and is exhausted through an exhaust port 14*b* into an air pipe 20*d*. That is, stored compressed air is expanded to be cooled down to room temperature or lower, and is extracted as cold air. Thus, in the present embodiment, the expander 14 is included in a cold heat extracting unit 13 of the present invention, and can extract air serving as working fluid as cold air through the air pipe 20*d*. The air pipe 20*d* is provided with a second heat exchanger 18*b*, so that air cooled to the room temperature or lower is supplied to the second heat exchanger 18*b* through the air pipe 20*d*.

The pressure accumulation tank 12 stores energy as compressed air to smoothen electric power output by renewable energy, so that the cold heat extracting unit 13 (expander 14) extracts cold air at room temperature or lower to enable cooling to be efficiently performed by the renewable energy. In particular, thermal efficiency can be greatly improved as compared with the case of directly using commercial electric power to produce cold heat. In addition, air can be efficiently cooled by using heat absorption due to expansion with power generation, so that the expander 14 is effectively used as the cold heat extracting unit 13 in the present embodiment.

The generator 16 is electrically connected to the electric power system 4, and electric power generated by the generator 16 (hereinafter referred to as "generated electric power") is supplied to the electric power system 4 or the motor 8*a* (refer to one-dot chain lines in FIG. 1). A supply destination of the generated electric power can be changed by switching a switch 30. Switching of the switch 30 may be switched in accordance with demand electric power requested from the electric power system 4.

The first heat exchanger 18*a* exchanges heat between compressed air in the air pipe 20*a* fluidly connecting the compressor 10 and the pressure accumulation tank 12 to each other, and a heat medium in a heat medium pipe 34*a*, and recovers compression heat generated in the compressor 10 to the heat medium. That is, the first heat exchanger 18*a* causes temperature of the compressed air to decrease, and temperature of the heat medium to increase. In particular, the temperature of the compressed air is lowered to a near room temperature for thermal energy loss prevention and cold heat recovery, described later. The "near room temperature" means a temperature at which energy held by compressed air is not largely lost when the compressed air releases its heat to the outside air while being stored in the pressure accumulation tank 12. While a temperature of the "near room temperature" varies depending on temperature of an installation location of the pressure accumulation tank 12 (outside air temperature in the present embodiment), a temperature of about 10 to 50° C. is appropriate. Here, the heat medium increased in temperature is supplied to a third heat exchanger 18*c* to be used for heat exchange. The first heat exchanger 18*a* may be a simple cooling mechanism such as a cooling tower.

By providing the first heat exchanger 18*a*, energy loss due to heat radiation in the pressure accumulation tank 12 can be prevented. When the first heat exchanger 18*a* is not provided, compressed air with temperature increased by compression heat is supplied to the pressure accumulation tank 12. In this case, the compressed air increased in temperature releases its heat to the outside air while being stored in the pressure accumulation tank 12, so that thermal energy is lost.

To prevent this, the first heat exchanger 18*a* is provided to lower temperature of the compressed air supplied to the pressure accumulation tank 12 to the near room temperature.

With regard to extracting cold heat, the first heat exchanger 18*a* lowers temperature of the compressed air to the near room temperature, so that temperature of air supplied to the expander 14 is also lowered to the near room temperature. Thus, the air at the near room temperature is expanded by the expander 14, and is further lowered in temperature from the near room temperature due to thermal expansion absorption, so that temperature of air to be exhausted can be made equal to or lower than the room temperature. This enables cold heat to be recovered as cold air at the room temperature or lower.

The second heat exchanger 18*b* exchanges heat between air at the room temperature or lower discharged from the expander 14 through the air pipe 20*d*, and water supplied from a water supply unit 19 through a cold water pipe 40, to cool the water to the room temperature or lower, and then extracts it as cold water (cooling refrigerant). The extracted cold water is used for cooling and the like. Thus, the second heat exchanger 18*b* is included in the cold heat extracting unit 13 of the present invention. For example, customers of cooling include a data center where a huge amount of cooling is required for cooling computers, a precision machine plant required to be adjusted to a constant temperature due to limitation in a manufacturing process, a semiconductor factory, and the like. When air in the air pipe 20*d* increased in temperature due to heat exchange in the second heat exchanger 18*b* is still kept at a low temperature that can still be used for cooling, the air may be supplied to the above-mentioned customers of cooling and the like to be used for cooling.

By providing the second heat exchanger 18*b*, cold water can be extracted to be used for cooling. In addition, temperature of the cold water can be adjusted to a constant temperature by adjusting the amount of heat exchange between cool air and the water.

Further, air at the room temperature or lower, which is discharged from the expander 14 through the air pipe 20*d*, or cold water cooled at the second heat exchanger 18*b*, may be supplied to the first heat exchanger 18*a* to be used for cooling the compressed air.

Because cold heat is supplied to the first heat exchanger 18*a*, from the expander 14 or the second heat exchanger 18*b*, serving as the cold heat extracting unit 13, it is unnecessary to supply cold heat for cooling compressed air from outside the system. In addition, extracted cold heat can be effectively used with a simple structure.

While water is used as a refrigerant in the present embodiment, a mixture obtained by adding antifreeze or the like to water, or a refrigerant such as alternative freon, may be used.

With regard to extracting hot heat, because the first heat exchanger 18*a* serves as a hot heat extracting unit 17, hot heat can be extracted in addition to cold heat to enable thermal efficiency to be further improved. In addition, there is no need to add new equipment for extracting hot heat, so that hot heat can be extracted at low cost and with a simple structure.

The first heat exchanger 18*a* and the third heat exchanger 18*c* are fluidly connected to a heat storage tank 32*a* through the heat medium pipe 34*a*. The heat storage tank 32*a* is thermally insulated so that temperature of a heat medium therein is not changed, and the heat medium flows into the heat medium pipe 34*a*. The heat medium is not limited in kind, and may be water, oil, or the like, for example. The heat medium pipe 34*a* is provided with a pump 36*a*. The pump 36a circulates a heat medium among the heat storage tank 32a, the first heat exchanger 18a, and the third heat exchanger 18c, through the heat medium pipe 34a.

The third heat exchanger 18c exchanges heat between the heat medium increased in temperature in the first heat exchanger 18a, and water supplied from the water supply unit 19 through a hot water pipe 42c, to increase temperature of the water to a predetermined temperature at which the water can be used for heating. The hot water made here is used for heating. Thus, the third heat exchanger 18c is included in the hot heat extracting unit 17 of the present invention. Meanwhile, the heat medium lowered in temperature in the third heat exchanger 18c is supplied to the heat storage tank 32a through the heat medium pipe 34a to be stored. The heat medium is supplied to the first heat exchanger 18a from the heat storage tank 32a to be circulated. The third heat exchanger 18c may increase temperature of not only water but also another heat medium such as oil. The third heat exchanger 18c is not necessarily provided. The third heat exchanger 18c may be eliminated, and a heat medium increased in temperature in the first heat exchanger 18a may be used for heating.

The third heat exchanger 18c is fluidly connected to a refrigerator 38. The third heat exchanger 18c supplies a part of hot heat to the refrigerator 38 to convert it into cold heat to be used for cooling. Thus, the refrigerator 38 is included in the cold heat extracting unit 13 of the present invention. While the third heat exchanger 18c supplies hot heat to the refrigerator 38 in the present embodiment, the first heat exchanger 18a may supply hot heat to the refrigerator 38 by fluidly connecting the first heat exchanger 18a to the refrigerator 38. In addition, a valve or the like (not illustrated) may be provided so that hot heat may be supplied to the refrigerator 38 if necessary to switch between cooling and heating. The refrigerator 38 can convert hot heat into cold heat to extract the cold heat, so that more cold heat can be supplied to a customer who needs a large amount of cold heat, such as a data center and a large computer. As the refrigerator of the present embodiment, it is possible to use various refrigerators for converting hot heat to cold heat, such as an absorption type refrigerator, and an adsorption type refrigerator.

In the present embodiment, a fourth heat exchanger 18d and a fifth heat exchanger 18e are also provided to recover heat that is relatively smaller than compression heat, such as electric loss and mechanical loss in the motor 8a and the generator 16. The fourth heat exchanger 18d and the fifth heat exchanger 18e each exchange heat between water supplied from the water supply unit 19 through the hot water pipes 42a and 42b, and a heat medium increased in temperature by heat recovery from the motor 8a and the power generator 16, to increase temperature of the water to a predetermined temperature, and extracts the water as hot water. Thus, the fourth heat exchanger 18d and the fifth heat exchanger 18e are included in the hot heat extracting unit 17 of the present invention. The extracted hot water can be used for a hot bath facility, a heated pool, an agricultural facility, heating, and the like. The heat medium in the heat medium pipes 34b and 34c are circulated by the pumps 36b and 36c, respectively.

The CAES power generation apparatus 2 of the present embodiment includes a high pressure compressor 28 that compresses air to a higher pressure than the compressor 10, and a high pressure accumulation tank (high-pressure accumulation tank) 24 that has a permissible accumulation value higher than a permissible accumulation value of the pressure accumulation tank 12.

The high pressure compressor 28 is mechanically connected to a motor 8b like the compressor 10. When driven by the motor 8b, the high pressure compressor 28 sucks air through an intake port 28a to compress the air to a higher pressure than the compressor 10, and supplies the compressed air to the high pressure accumulation tank 24 through a discharge port 28b. This causes pressure in the high pressure accumulation tank 24 to be usually higher than pressure in the pressure accumulation tank 12. As an example of pressure (accumulated value of each of the pressure accumulation tank 12 and the high pressure accumulation tank 24, it is conceivable that the pressure accumulation tank 12 is set to less than 0.98 MPa and the high pressure accumulation tank 24 is set to about 4.5 MPa.

The high pressure accumulation tank 24 is fluidly connected to the pressure accumulation tank 12 and the expander 14 through an air pipe 20c. Specifically, the air pipe 20c is fluidly connected at its one end to the high pressure accumulation tank 24, and is fluidly connected at its other end to the air pipe 20b. The air pipe 20c is provided with a flow control valve 26, so that a flow rate of air to be supplied to the pressure accumulation tank 12 and the expander 14 can be adjusted by adjusting opening of the flow control valve 26. Electric power can be generated by supplying high pressure air reduced in pressure to the expander 14, and the amount of compressed air stored in the pressure accumulation tank 12 can be compensated by supplying high pressure air reduced in pressure to the pressure accumulation tank 12.

By providing the high pressure accumulation tank 24 and the high pressure compressor 28, it is possible to supply emergency power and cooling for a long time in an emergency such as a power failure. Specifically, the flow control valve 26 is closed during normal time, and internal pressure of the high pressure accumulation tank 24 is kept high. When a large amount of power generation is required due to a power failure or the like, and when internal pressure of the pressure accumulation tank 12 is reduced after power generation for a long time, the flow control valve 26 is opened so that a large amount of compressed air is supplied to the expander 14 from the high pressure accumulation tank 24. This enables the amount of power generation of the generator 16 driven by the expander 14 to be prevented from decreasing, and also enables cold heat to be extracted at the same time. This is particularly effective for a customer who needs a large amount of cold heat, such as a data center and a large computer.

The compressor 10 and the expander 14 of the present embodiment are not limited in type, and a screw type, a scroll type, a turbo type, a reciprocating type, or the like may be available. However, it is preferable to use a screw type to linearly follow irregularly fluctuating input electric power with high response. While the number of each of the compressor 10 and the expander 14 is one, the number thereof is not particularly limited, and may be two or more. In addition, the high pressure compressor 28 is not limited in type, and a reciprocating type is preferable to compress air under high pressure and keep it.

Figure 2:
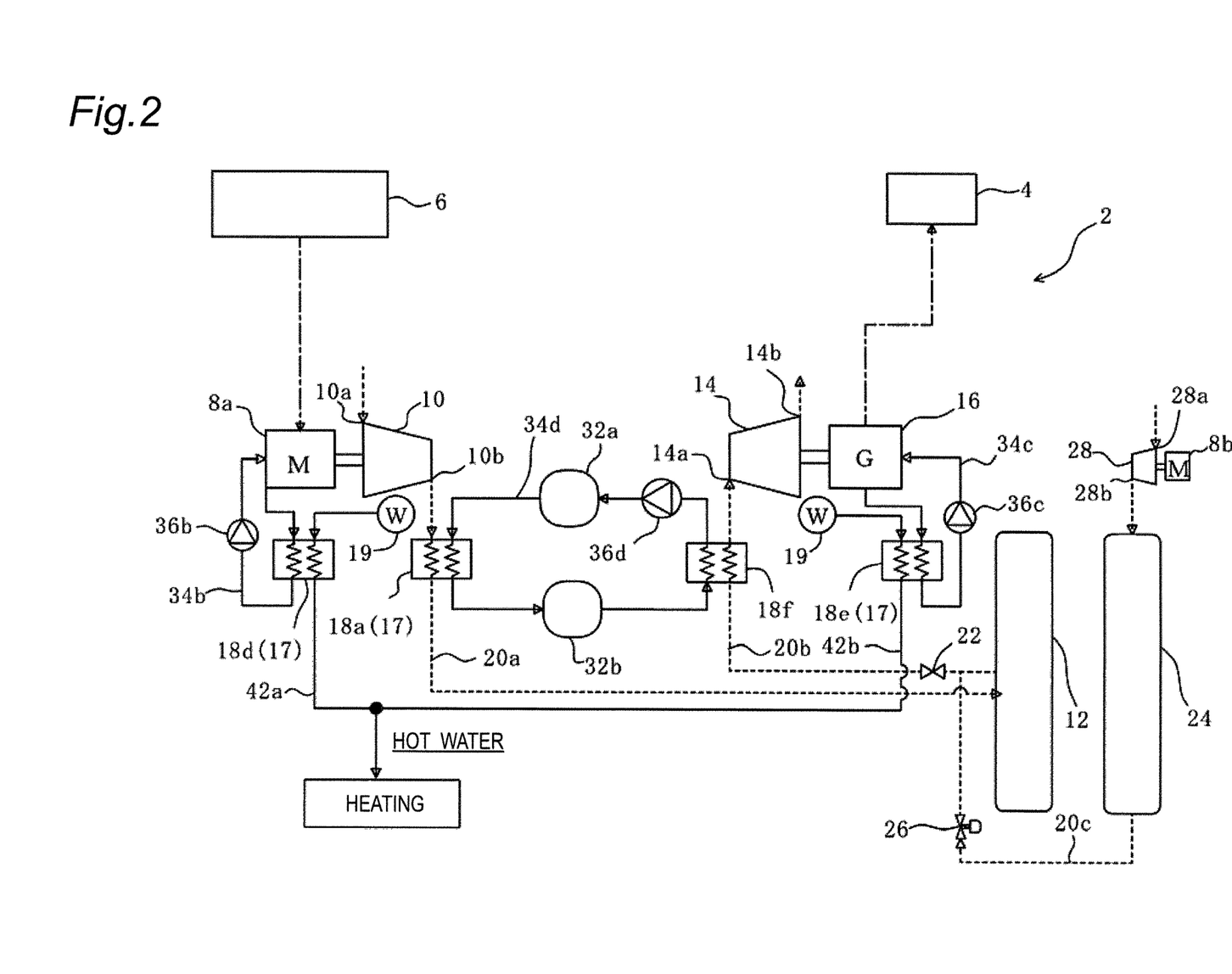
FIG. 2 is a schematic configuration view of the compressed air storage power generation.

FIG. 2 is a schematic configuration diagram of a CAES power generation apparatus 2 when emphasis is placed on power generation efficiency rather than extracting cold heat, unlike the present embodiment. FIG. 2 illustrates a comparative example in which a second heat exchanger 18b is eliminated from the first embodiment of FIG. 1, and a sixth heat exchanger 18f is provided. As the sixth heat exchanger 18f is provided, two heat storage tanks 32a and 32b each are provided to store a heat medium at different temperature.

Structure other than the above is substantially the same as that in FIG. 1, and similar components are denoted by the same respective reference numerals to eliminate description thereof.

The sixth heat exchanger 18f exchanges heat between compressed air in an air pipe 20b extending from a pressure accumulation tank 12 to an expander 14, and a heat medium circulating in a heat medium pipe 34d, to increase temperature of the compressed air before being expanded by the expander 14. That is, in the sixth heat exchanger 18f, temperature of the compressed air is increased and temperature of the heat medium is lowered. The heat medium lowered in temperature by the sixth heat exchanger 18f is supplied to a heat storage tank 32a to be stored. The heat medium stored in the heat storage tank 32a is supplied to a first heat exchanger 18a through the heat medium pipe 34d. The heat medium increased in temperature in the first heat exchanger 18a is supplied to the heat storage tank 32b to be stored. The heat medium stored in the heat storage tank 32b is supplied to the sixth heat exchanger 18f through the heat medium pipe 34d. The heat medium pipe 34d is provided with a pump 36d for causing a heat medium to flow, so that the heat medium is circulated by the pump 36d. When temperature of compressed air is increased before the compressed air is expanded, as described above, expansion efficiency can be improved to enable power generation efficiency to be improved.

Second Embodiment

Figure 3:
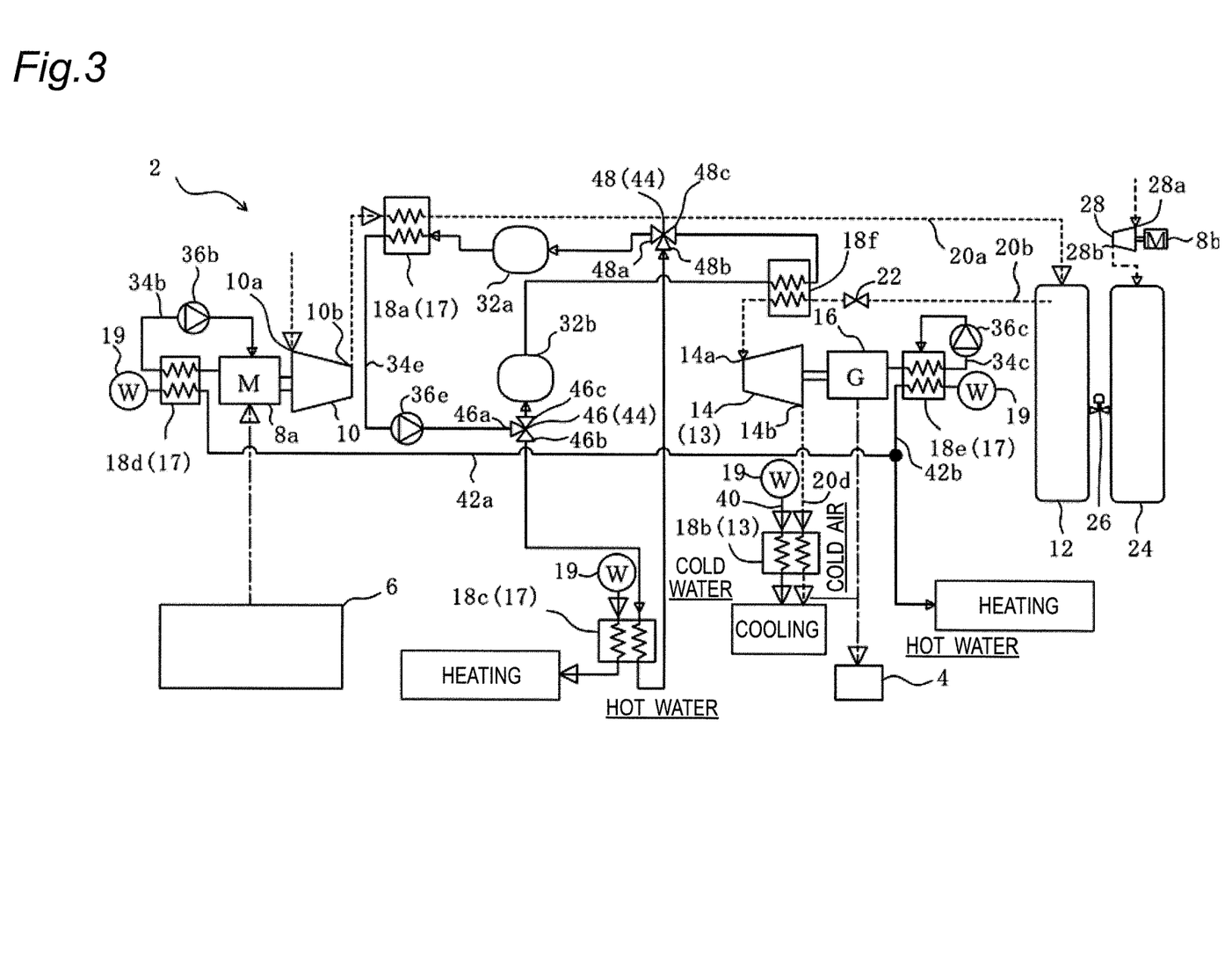
FIG. 3 is a schematic configuration view of a compressed air energy storage power generation apparatus according to a second embodiment of the present invention.

FIG. 3 illustrates a CAES power generation apparatus 2 of the second embodiment that has structure of a combination of the first embodiment of FIG. 1 and the comparative example of FIG. 2. Specifically, the structure is capable of performing not only a cold heat extracting mode in which efficiency of extracting cold heat is improved by the expander 14 of the first embodiment illustrated in FIG. 1, but also a power generation mode in which power generation efficiency is improved by the generator 16 of the comparative example illustrated in FIG. 2, and includes a mode switching mechanism 44 for switching between the two modes.

The mode switching mechanism 44 includes three-way valves 46 and 48. The three-way valves 46 and 48 are provided in the heat medium pipe 34e. The one three-way valve 46 includes a first port 46a connected to a first heat exchanger 18a, a second port 46b connected to a third heat exchanger 18c, and a third port 46c connected to a heat storage tank 32b. The other three-way valve 48 includes a first port 48a connected to a heat storage tank 32a, a second port 48b connected to the third heat exchanger 18c, a third port 48c connected to a sixth heat exchanger 18f. Thus, it is possible to switch to a required mode by opening or closing the corresponding ports 46a to 46c, and ports 48a to 48c, of the respective three-way valves 46 and 48, to allow or interrupt flows of a heat medium among the components described above.

In the cold heat extracting mode, the one three-way valve 46 opens the first port 46a and the second port 46b, and closes the third port 46c. The other three-way valve 48 opens the first port 48a and the second port 48b, and closes the third port 48c. Accordingly, the heat medium in the heat medium pipe 34e flows through the heat storage tank 32a, the first heat exchanger 18a, the three-way valve 46, the third heat exchanger 18c, the three-way valve 48, and the heat storage tank 32a, in this order, and is circulated by the pump 36e.

In the power generation mode, the one three-way valve 46 opens the first port 46a and the third port 46c, and closes the second port 46b. The other three-way valve 48 opens the first port 48a and the third port 48c, and closes the second port 48b. Accordingly, the heat medium in the heat medium pipe 34e flows through the heat storage tank 32a, the first heat exchanger 18a, the three-way valve 46, the heat storage tank 32b, the sixth heat exchanger 18f, the three-way valve 48, and the heat storage tank 32a, in this order, and is circulated by the pump 36e.

By providing the mode switching mechanism 44, it is possible to switch modes as needed, whereby not only thermal efficiency but also charge-discharge efficiency can be achieved. In other words, when a factory stops not to require cold heat, such as a holiday and a national holiday, the CAES power generation apparatus 2 may be operated in the power generation mode by giving priority to power selling to a commercial system, and when the factory is in operation to require cold heat, the CAES power generation apparatus 2 may be operated in the cold heat extracting mode.

Figure 4:
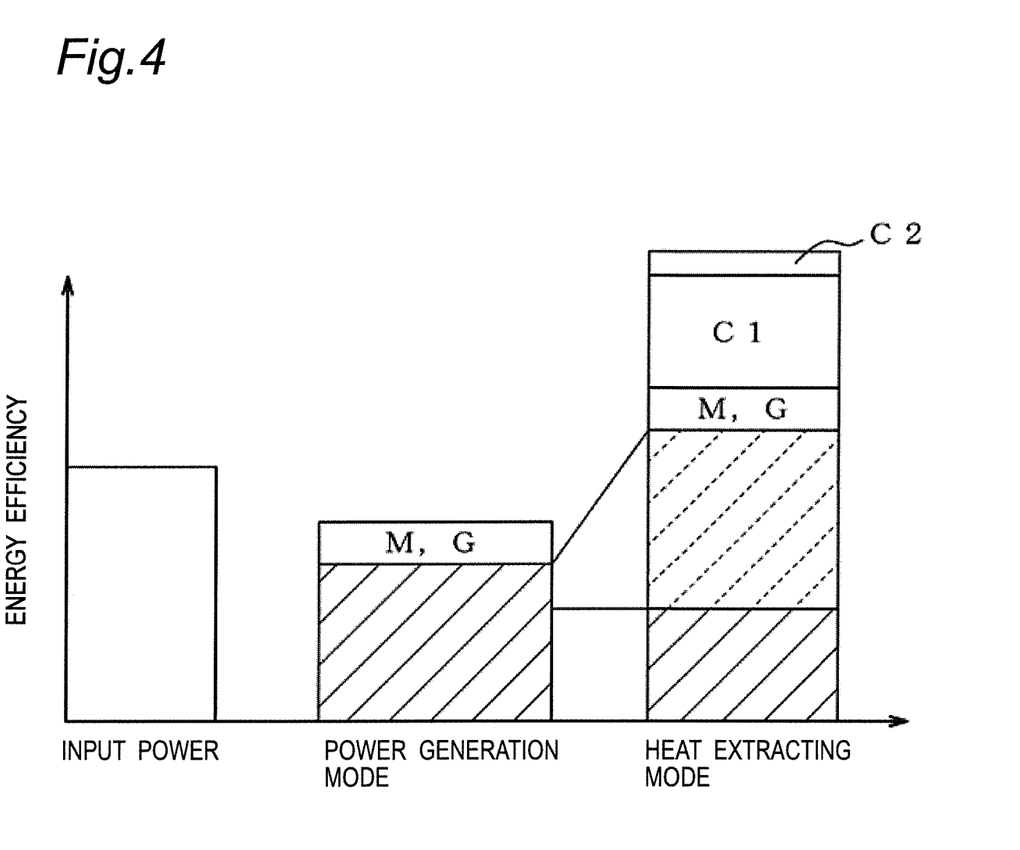
FIG. 4 is a bar graph showing an energy efficiency of each mode to an input electric power.

FIG. 4 illustrates energy efficiency of the power generation mode and the cold heat extracting mode with respect to input power. When power generation efficiency with respect to the input power (solid hatched area) is compared between the power generation mode and the cold heat extracting mode, the power generation mode has higher power generation efficiency. This is because while heat recovered by the first heat exchanger 18a is used for heating to improve thermal efficiency (dashed hatched area) in the cold heat extracting mode, the heat recovered by the first heat exchanger 18a is used to heat air before being expanded in the sixth heat exchanger 18f to improve power generation efficiency in the power generation mode. While both the modes are common in that the hot heat is extracted as hot water from the motor 8a and the generator 16 through the fourth heat exchanger 18d and the fifth heat exchanger 18e (a portion of M and G), cold heat is further extracted to be used for cooling in the cold heat extracting mode (portions C1 and C2). The C1 portion shows cold heat extracted as cold water through a cold water pipe 40 after heat exchange in the second heat exchanger 18b, and the C2 portion shows cold heat extracted as cold air through the air pipe 20d still having temperature equal to or lower than the room temperature after the heat exchange in the second heat exchanger 18b. Comprehensive energy efficiency is higher in the cold heat extracting mode than in the power generation mode. While the graph shows that the energy efficiency in the cold heat extracting mode is higher than the input power to exceed 100%, this is because cold and hot heat can be recovered and used by obtaining energy from surrounding air. While overall energy efficiency varies depending on an extraction ratio of cold and hot heat, efficiency as high as 180% (coefficient of performance (COP) is 1.8) can be expected as an example.

Third Embodiment

Figure 5:
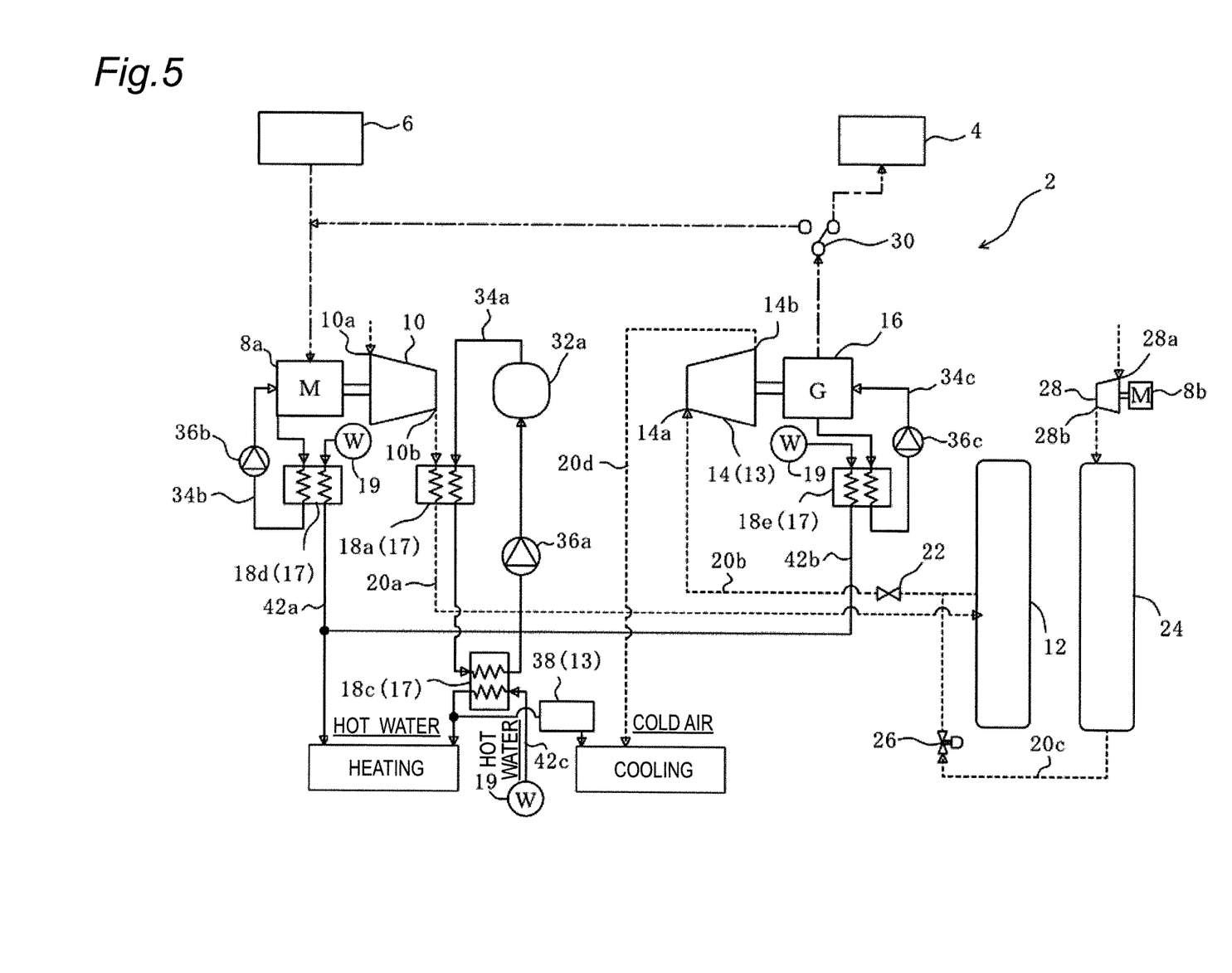
FIG. 5 is a schematic configuration view of a compressed air energy storage power generation apparatus according to a third embodiment of the present invention.

FIG. 5 is a schematic configuration diagram of a CAES power generation apparatus 2 of a third embodiment. The CAES power generation apparatus 2 of the present embodiment is substantially the same as that of the first embodiment of FIG. 1 other than the configuration related to the cold heat extracting unit 14. Thus, description of a component similar to that illustrated in FIG. 1 will be eliminated.

The CAES power generation apparatus 2 of the present embodiment is configured by eliminating the second heat exchange portion 18b and the cold water pipe 40 from the CAES power generation apparatus 2 of the first embodiment in FIG. 1. Thus, cold air supplied from the exhaust port 14b of the expander 14 through the air pipe 20d may be directly used for cooling.

As described above, cold air may be directly used for cooling without making cold water through the second heat exchanger 18b or the like. In this case, equipment such as the second heat exchanger 18b and the cold water pipe 20d (refer to FIG. 1) for producing cold water is unnecessary, so that cold heat can be extracted and used with a simple structure. However, when cold air has an extremely low temperature or when fluctuation of the amount of cold air causes trouble, it is desirable to provide a heat storage tank for cold heat to supply cold air with a necessary temperature and amount.

In each of the embodiments described above, an object of, power generation by renewable energy is steadily (or repeatedly) replenished with a natural force such as wind power, sunlight, solar heat, wave force or tidal power, and running water or tidal, and everything using irregularly fluctuating energy can be targeted. In addition, there may be a case where electric power fluctuates due to another equipment consuming large electric power in a factory.

The invention claimed is:

1. A compressed air energy storage power generation apparatus comprising:
   an electric motor driven by irregularly fluctuating input electric power;
   a compressor mechanically connected to the electric motor for compressing air, the compressed air being heated to a first temperature by the compressor;
   a pressure accumulator for storing the compressed air compressed by the compressor;
   an expander driven by the compressed air supplied from the pressure accumulator;
   a generator mechanically connected to the expander;
   a first heat exchanger, provided between the compressor and the pressure accumulator such that the compressor, the first heat exchanger, and the pressure accumulator are fluidly connected via an air pipe,
   the first heat exchanger exchanging heat between the compressed air supplied from the compressor at the first temperature and a first heat transfer medium,
   the first heat exchanger cooling the compressed air to a second temperature that is lower than the first temperature and the first heat exchanger heating the first heat transfer medium,
   the second temperature being near room temperature;
   a cold-side heat extracting unit that extracts air serving as working fluid as air having a temperature that is equal to or lower than room temperature; and
   second heat exchanger disposed between the pressure accumulator and the expander,
   the second heat exchanger heating the compressed air supplied from the accumulator before the compressed air is supplied to the expander.

2. The compressed air energy storage power generation apparatus according to claim 1, wherein
   the cold-side heat extracting unit includes an exhaust port of the expander.

3. The compressed air energy storage power generation apparatus according to claim 2, wherein
   the first heat exchanger serves as a hot-side heat extracting unit that extracts compression heat recovered by heat exchange.

4. The compressed air energy storage power generation apparatus according to claim 3, wherein
   the hot-side heat extracting unit is fluidly connected to a refrigerator.

5. The compressed air energy storage power generation apparatus according to claim 2, further comprising:
   a mode switching mechanism that switches between a heat extracting mode, in which an efficiency of extracting heat with the cold-side heat extracting unit is improved, and a power generation mode, in which an efficiency of generating power with the generator is improved.

6. The compressed air energy storage power generation apparatus according to claim 2, further comprising:
   a high pressure accumulator that has an allowable accumulated pressure value higher than an allowable accumulated pressure value of the pressure accumulator; and
   a high pressure compressor that compresses air to a higher pressure than the compressed air compressed by the compressor to supply the compressed air to the high pressure accumulator.

7. The compressed air energy storage power generation apparatus according to claim 1, wherein
   the first heat exchanger serves as a hot-side heat extracting unit that extracts compression heat recovered by heat exchange.

8. The compressed air energy storage power generation apparatus according to claim 7, wherein
   the hot-side heat extracting unit is fluidly connected to a refrigerator.

9. The compressed air energy storage power generation apparatus according to claim 1, further comprising:
   a mode switching mechanism that switches between a heat extracting mode, in which an efficiency of extracting heat with the cold-side heat extracting unit is improved, and a power generation mode, in which an efficiency of generating power with the generator is improved.

10. The compressed air energy storage power generation apparatus according to claim 1, further comprising:
    a high pressure accumulator that has an allowable accumulated pressure value higher than an allowable accumulated pressure value of the pressure accumulator; and
    a high pressure compressor that compresses air to a higher pressure than the compressed air compressed by the compressor to supply the compressed air to the high pressure accumulator.

11. A compressed air energy storage power generation method, using the compressed air energy storage power generation apparatus according to claim 1, the method comprising:
    compressing air to a first temperature with irregularly fluctuating input electric power;
    cooling the compressed air from the first temperature to a second temperature that is lower than the first temperature, the second temperature being near room temperature;
    storing the compressed air at the second temperature; and
    expanding the stored compressed air to be used for power generation and cooling down the compressed air from the second temperature to a temperature that is equal to or lower than room temperature, to be extracted as air having a temperature that is equal to or lower than room temperature.

12. A compressed air energy storage power generation apparatus comprising:
- an electric motor driven by irregularly fluctuating input electric power;
- a compressor mechanically connected to the electric motor for compressing air, the compressed air being heated to a first temperature by the compressor;
- a pressure accumulator for storing the compressed air compressed by the compressor;
- an expander driven by the compressed air supplied from the pressure accumulator;
- a generator mechanically connected to the expander;
- a first heat exchanger, provided between the compressor and the pressure accumulator such that the compressor, the first heat exchanger, and the pressure accumulator are fluidly connected via an air pipe,
- the first heat exchanger exchanging heat between the compressed air supplied from the compressor at the first temperature and a first heat transfer medium, the first heat exchanger cooling the compressed air to a second temperature that is lower than the first temperature and the first heat exchanger heating the first heat transfer medium,
- the second temperature being near room temperature; and
- a cold-side heat extracting unit that extracts air serving as working fluid as air having a temperature that is equal to or lower than room temperature, wherein
- the cold-side heat extracting unit includes a second heat exchanger that exchanges heat between the air having a temperature that is equal to or lower than room temperature, supplied from the expander, and a second heat transfer medium to cool the second heat transfer medium to the temperature that is equal to or lower than room temperature, to obtain a cooling refrigerant.

13. A compressed air energy storage power generation apparatus comprising:
- an electric motor driven by irregularly fluctuating input electric power;
- a compressor mechanically connected to the electric motor for compressing air, the compressed air being heated to a first temperature by the compressor;
- a pressure accumulator for storing the compressed air compressed by the compressor;
- an expander driven by the compressed air supplied from the pressure accumulator;
- a generator mechanically connected to the expander;
- a first heat exchanger, provided between the compressor and the pressure accumulator such that the compressor, the first heat exchanger, and the pressure accumulator are fluidly connected via an air pipe,
- the first heat exchanger exchanging heat between the compressed air supplied from the compressor at the first temperature and a first heat transfer medium, the first heat exchanger cooling the compressed air to a second temperature that is lower than the first temperature and the first heat exchanger heating the first heat transfer medium,
- the second temperature being near room temperature; and
- a cold-side heat extracting unit that extracts air serving as working fluid as air having a temperature that is equal to or lower than room temperature, wherein
- the cold-side heat extracting unit includes an exhaust port of the expander, and
- the cold-side heat extracting unit includes a second heat exchanger that exchanges heat between the air having a temperature that is equal to or lower than room temperature, supplied from the expander, and a second heat transfer medium, to cool the second heat transfer medium to the temperature that is equal to or lower than room temperature, to obtain a cooling refrigerant.

\* \* \* \* \*